(No Model.)

G. N. BRISBIN & J. COPPER.
WORKING BODY CHURN.

No. 448,205. Patented Mar. 17, 1891.

Witnesses
J. M. Fowler Jr.
J. Edgar Smith

Inventors
Geo. N. Brisbin
John Copper
By their Attorneys,
C. A. Snow & Co.

UNITED STATES PATENT OFFICE.

GEORGE N. BRISBIN AND JOHN COPPER, OF SPENCER, IOWA.

WORKING BODY CHURN.

SPECIFICATION forming part of Letters Patent No. 448,205, dated March 17, 1891.

Application filed June 21, 1890. Serial No. 356,262. (No model.)

*To all whom it may concern:*

Be it known that we, GEORGE N. BRISBIN and JOHN COPPER, citizens of the United States, residing at Spencer, in the county of Clay and State of Iowa, have invented a new and useful Working Body Churn, of which the following is a specification.

This invention is an improvement in working-body churns, and has for its objects to provide a churn with which varying degrees of agitation may be given to the cream to suit the consistency thereof, and also to provide a churn whereby the cream may be quickly and easily converted into butter and which will be cheap of construction.

With these objects in view the invention resides in the various novel details of construction and in the combination of parts hereinafter fully described, and particularly pointed out in the claim at the end of this specification.

Figure 1:
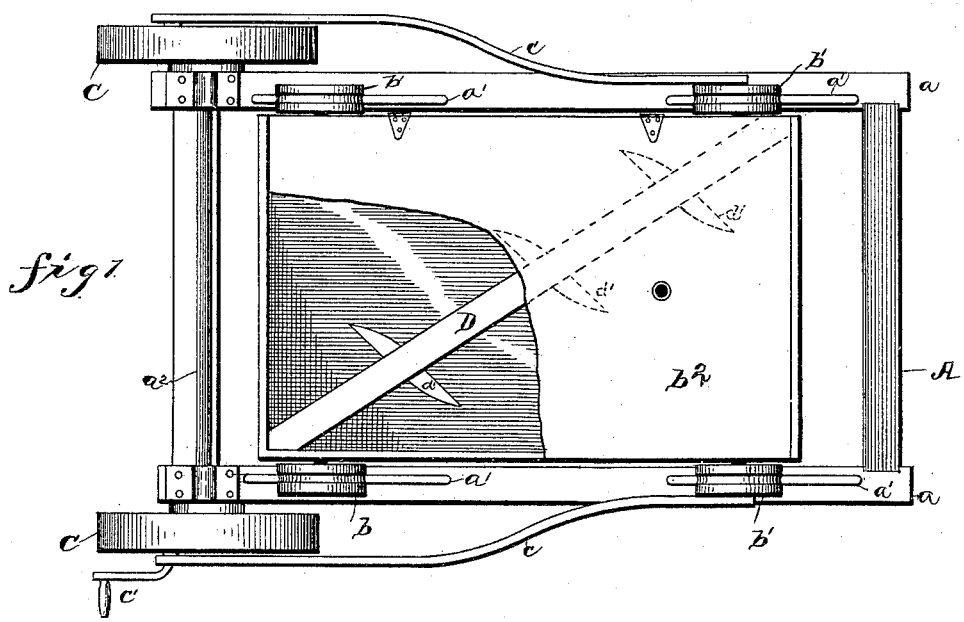
Figure 2:
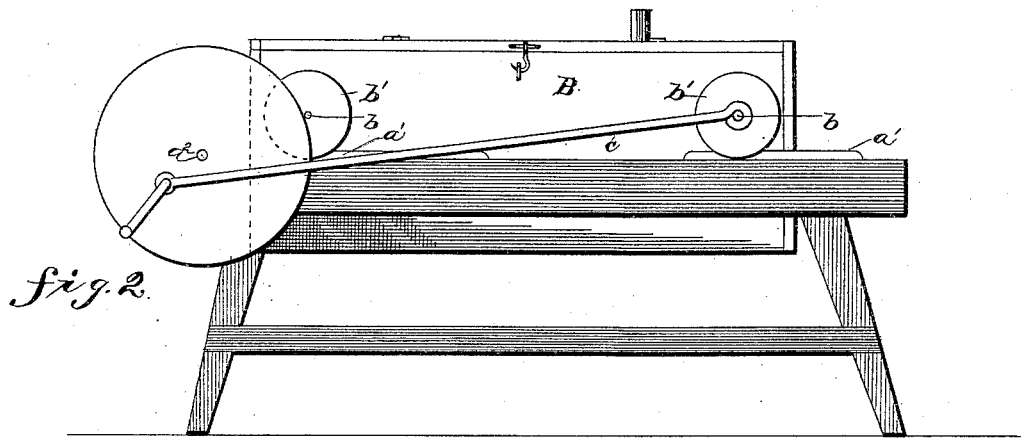
Figure 3:
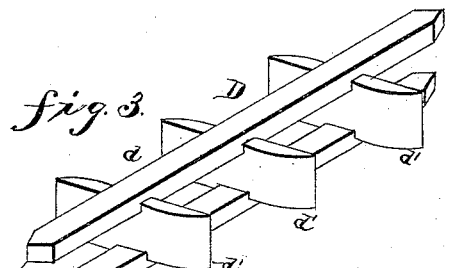

In the drawings in which we have illustrated our invention, forming part of this specification, throughout which like letters of reference indicate corresponding parts, Figure 1 is a plan view of my churn. Fig. 2 is a view in side elevation thereof. Fig. 3 is a view in perspective showing in detail the dasher.

In the drawings, letter A designates the frame-work, upon two of the longer sides $a$ whereof are provided raised ways $a'$.

B designates the churn-body, which is of rectangular shape and has extending outwardly from its two longer sides stub-axles $b$, upon which are journaled the grooved wheels $b'$, which roll upon the raised ways $a'$. The churn-body is thus supported within the frame. Upon one end of the frame A is journaled a shaft $a^2$, having upon either end the disks C fast thereon. These disks are connected by means of the pitmen $c$ to the rear axles $b$, and one of the said disks has its crank-pin extended to form a crank-lever $c'$.

D designates the dasher, which is composed of two parallel strips $d$, separated by means of the breaker-pieces $d'$, which are set into depressions or grooves in the parallel strips at an oblique angle. The strips $d$ have their ends beveled, as at $d^2$, in order to be easily inserted and yet fit snugly the corners of the churn-body. The breaker-pieces $d'$ have their ends pointed and their outer contour made by reversed curves.

The above-described dasher is placed diagonally within the churn-body and by the peculiar arrangement of the breaker-pieces $d'$ will present when occupying one of the diagonals of the rectangular churn-body but slight resistance to the cream as it courses back and forth therein, whereas when occupying the other diagonal the breaker-pieces $d'$ will present much greater resistance to the cream, as their position will be in a direction at right angles to the course of the cream passing from one end of the churn-body to the other, and hence when the cream is thin or when great power is used by placing the dasher in this last position the liquid will be the sooner converted into butter and buttermilk.

The churn-body B is provided with a hinged top $b^2$.

Having thus fully described our invention, what we claim as new, and desire to secure by Letters Patent, is—

In a working body churn, the combination of the rectangular body and a dasher arranged diagonally within the churn-body and composed of two parallel strips $d$, having beveled ends, and breaker-pieces $d'$, separating the strips $d$ and set at an oblique angle, substantially as described.

In testimony that we claim the foregoing as our own we have hereto affixed our signatures in presence of two witnesses.

GEORGE N. BRISBIN.
JOHN COPPER.

Witnesses:
C. A. CLAYPOOL,
J. E. STEELE.